United States Patent [19]
Stalherm et al.

[11] 4,102,751
[45] Jul. 25, 1978

[54] COKE OVEN BATTERY WITH CONTROL MEANS FOR CHANGING THE HEAT SUPPLY

[75] Inventors: Dieter Stalherm, Recklinghausen; Volker Kolitz, Gelsenkirchen, both of Fed. Rep. of Germany

[73] Assignee: Bergwerksverband GmbH, Essen, Fed. Rep. of Germany

[21] Appl. No.: 666,634

[22] Filed: Mar. 15, 1976

[30] Foreign Application Priority Data

Mar. 19, 1975 [DE] Fed. Rep. of Germany ....... 2511940

[51] Int. Cl.² .......................... C10B 5/12; F16K 11/00
[52] U.S. Cl. ...................................... 202/151; 201/26; 202/141; 202/143; 202/144
[58] Field of Search ............... 202/133, 135, 141, 144, 202/142, 143, 145, 151, 146; 201/37, 44, 26

[56] References Cited

U.S. PATENT DOCUMENTS

| | | | |
|---|---|---|---|
| 1,920,913 | 8/1933 | Pfluke et al. ........................ | 202/151 |
| 2,224,920 | 12/1940 | Otto .................................. | 202/141 X |
| 2,710,281 | 6/1955 | Weissenborn ....................... | 202/141 |
| 2,746,914 | 5/1956 | Ackeren ............................. | 202/142 |
| 2,804,428 | 8/1957 | Ackeren ............................. | 202/151 |
| 3,054,728 | 9/1962 | Schmidt et al. .................... | 202/151 X |
| 3,222,260 | 12/1965 | Becker ............................... | 202/135 X |
| 3,344,039 | 9/1967 | Nestler .............................. | 202/151 X |
| 3,833,478 | 9/1974 | Tucker ............................... | 202/143 |
| 3,875,016 | 4/1975 | Schmidt-Balve et al. ............ | 202/151 |

Primary Examiner—Morris O. Wolk
Assistant Examiner—Michael S. Marcus
Attorney, Agent, or Firm—Michael J. Striker

[57] ABSTRACT

A coke oven battery includes a plurality of coke ovens heated during certain time intervals and the heat supply being reduced subsequent to these time intervals. First valve means controls the flow of combustion air for the ovens and second valve means controls the flow of waste gases recovered from the ovens and recycled back to the ovens. A first primary activating means activates the first and second valve means. Third valve means controls the flow of decarbonizing air for the ovens and a second primary activating means activates the third valve means. Fourth valve means controls the pressure in the ovens and first auxiliary activating means activates the fourth valve means. Fifth valve means controls the flow of fuel for the ovens and second auxiliary activating means activates the fifth valve means. The coke ovens may be arranged in groups so that the coking conditions at any time are the same for all ovens of a given group. The first auxiliary activating means includes a plurality of first auxiliary control linkages each of which is associated with one of the groups while the second auxiliary activating means includes a plurality of second auxiliary control linkages each of which is associated with one of the groups. Automatic coupling means may couple the first primary activating means with the first auxiliary activating means and couple the second primary activating means with the second auxiliary activating means. This permits the primary activating means and the respective auxiliary activating means to be driven as units when both the primary activating means and the auxiliary activating means must be operative.

1 Claim, 5 Drawing Figures

COKE OVEN BATTERY WITH CONTROL MEANS FOR CHANGING THE HEAT SUPPLY

BACKGROUND OF THE INVENTION

The invention relates generally to coke oven batteries. Of particular interest to the invention is an arrangement for changing the heat supply to the ovens of a coke oven battery from a condition of extreme heating, that is, a condition in which large quantities of heat are supplied to the ovens, to a condition of lesser or no heating, that is, a condition in which smaller quantities of heat are supplied to the ovens or in which no heat is supplied to the ovens, as well as for changing the heat supply in the opposite sense.

An arrangement for changing the heat supply to the ovens of a coke oven battery is known and includes a control linkage which extends around the battery. This control linkage is operative for changing the flow of air and hot waste gases, as well as for regulating the supply of combustion air, via air inlet valves and waste gas throttle valves which may be in the form of butterfly valves. The arraangement includes a further control linkage which operates a three-way valve provided for the decarbonizing air.

The reason that it is desirable to be able to change the heat supply to the ovens of a coke oven battery is based on the finding that savings of up to 10 percent in heating costs may be realized when, instead of providing a constant heat supply for the ovens as has been the conventional practice, the heat supply is adjusted to the state of coking of the charge by so-called programmed heating. Such adjustment of the heat supply consists in that coking of the coal is carried out using a large heat supply at the beginning of the coking operation with the heat supply being reduced towards the end of the coking operation. The regulation of the heat supply may be effected by means of a control program which operates via fuel gas and air valves, as well as waste gas valves and throttling flaps, provided for each heating wall of the coke oven battery. This control program requires relatively large expenditures for the measuring and regulating mechanisms which are necessary.

With respect to the savings in heating costs, it is especially significant that an effective heating program need not provide particularly fine control over the heat supply during the entire duration of the coking period. The reason resides in that the thermal response of an oven system is generally quite sluggish. In fact, it has been found to be adequate when phases of extreme heating alternate with phases of no heat supply whatsoever. Here, the periods for which the heat supply is interrupted become longer as the coking operation progresses.

Although the known programmed arrangements for changing the heat supply operate reasonably satisfactorily, they possess the disadvantage mentioned earlier, namely, that they require large expenditures for the measuring and regulating mechanisms which are necessary.

SUMMARY OF THE INVENTION

One object of the invention is to provide a coke oven battery which includes an arrangement for changing the heat supply to the ovens or oven chambers of the battery that is more economical than the arrangements of the prior art.

Another object of the invention is to provide an arrangement for changing the heat supply to the ovens of a coke oven battery which, by virtue of simpler and more readily accessible devices, may be manufactured and regulated more economically than the arrangements known heretofore.

These objects, as well as others which will become apparent as the description proceeds, are achieved in accordance with the invention. According to one aspect of the invention, there is provided a coke oven battery which includes a plurality of coke ovens arranged to be heated by supplying large quantities of heat to the same during certain time intervals and reducing the heat supply subsequent to these intervals. First valve means is provided for controlling the flow of combustion air for the ovens and second valve means is provided for controlling the flow of waste gases recovered from the ovens. First primary activating means is provided for activating the first and second valve means. In addition to the latter, there is provided third valve means for controlling the flow of decarbonizing air for the ovens and second primary activating means is provided for activating the third valve means. Fourth valve means is provided for controlling the pressure in the ovens and first auxiliary activating means is provided for activating the fourth valve means. Fifth valve means is provided for controlling the flow of fuel for the ovens and second auxiliary activating means is provided for activating the fifth valve means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
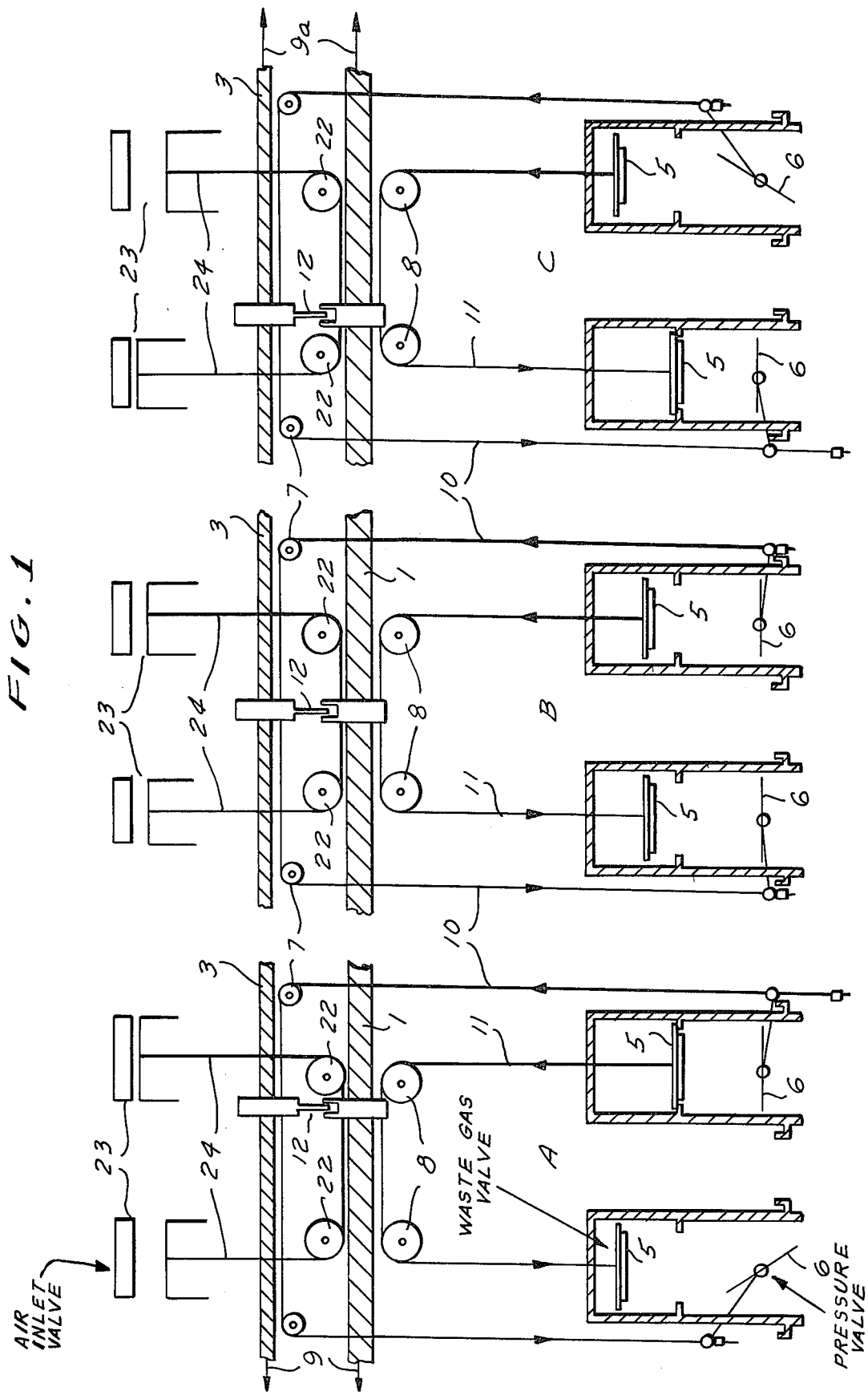
FIG. 1 schematically represents a portion of an embodiment of the invention during a period in which large quantities of heat are supplied to the ovens of a coke oven battery.

As mentioned earlier, the invention relates in one of its aspects to an arrangement for changing the heat supply to the ovens of a coke oven battery from a condition of extreme heating, that is, a condition in which large quantities of heat are supplied to the ovens, to a condition of lesser or no heating, that is, a condition in which smaller quantities of heat are supplied to the ovens or in which no heat is supplied to the ovens, as well as for changing the heat supply in the opposite sense. In a preferred embodiment, the invention contemplates an arrangement for changing the heat supply to the ovens of a coke oven battery from a condition of extreme heating to a condition in which no heat is supplied to the ovens and this will be the premise in the description which follows.

A preferred aspect of the arrangement according to the invention includes a first primary activating means or first primary control linkage which extends around the coke oven battery. The primary control linkage is operative for changing the flow of air and hot waste gases as well as for the regulating the supply of combustion air, via first valve means or air inlet valves and second valve means or waste gas throttle valves which may be in the form of flaps or butterfly valves. The preferred aspect of the arrangement further includes a second primary activating means or second primary control linkage which activates third valve means provied for the decrbonizing air. The third valve means advantageously includes three-way valves.

With such an arrangement, the objects of the invention are achieved in that there is provided, in addition to the first and second primary activating means, a first auxiliary activating means for activating the valves which serve to control the pressure in the ovens, that is, fourth valve means, as well as a second auxiliary activating means for activating the valves which serve to control the flow of fuel such as gas to the ovens, that is, fifth valve means. The valves for controlling the pressure in the ovens may be in the form of flaps or butterfly valves.

A favorable embodiment of the invention contemplates that a valve for controlling the flow of fuel be provided for each heating wall and heating phase.

A particularly advantageous embodiment of the invention provides for the ovens of the coke oven battery to be subdivided into groups which are arranged in such a manner that the coking conditions, or the degree to which coking has progressed, are or is virtually the same for all ovens of a given group at a given time. Here, the first auxiliary activating means comprises a control linkage for each group, that is, the first auxiliary activating means comprises a first auxiliary control linkage associated with each group of ovens. Similarly, the second auxiliary activating means includes a control linkage for each group or, in other words, includes a second auxiliary control linkage associated with each group of ovens. It is especially favorable for each group to include 5 to 10 ovens.

The coke oven battery according to the invention may be of the underfire type, that is, the type where the fuel such as gas is introduced from below the battery.

Another advantageous embodiment of the invention contemplates for the primary activating means to be arranged adjacent the auxiliary activating means for automatic coupling devices to be provided intermediate the primary activating means and the auxiliary activating means.

The technical advance achievable with a regulating arrangement of the type set forth by the invention resides in that it may be constructed in an economical manner from devices which operate in a simple mechanical fashion and in that it offers the possibility of carrying out a programmed regulation of the heat supply expediently and economically. Furthermore, the regulation achievable with the invention enables ovens having the same coking conditions to be combined into groups containing a plurality of ovens such as, for example, groups containing 5 to 10 ovens.

The programmed regulation of the heat supply to coke ovens is known and, accordingly, will not be described herein. In this connection, reference may be nad, for example, to an article by W. Rohde, D. Stalherm and K. G. Beck entitled "Evaluation of Improved Silica Ovens at Emil Plant of Bergbau-Forschung GmbH" and published in the periodical Ironmaking Proceedings, volume 34, 1975 (Toronto).

Before proceeding to a description of the drawings, it is further pointed out that various heating systems, with which there are associated various flow patterns for the heating gases, are known for coke ovens. Since the heating systems used for coke ovens constitute part of the knowledge of the art, a detailed description of such heating systems need not be undertaken here. Information on the heating systems for coke ovens is available, for instance, from the German publication "Handbuch der Kokereitechnik" by Grosskinski, volume 1, pages 162ff. This publication, which is referred to as "Das Fachbuch" (The Book of the Trade) in the German language, contains information not only on the flow paths of the heating gases in ovens having different heating systems but also contains information on the known arrangements for changing the heat supply to the ovens.

Information on coke ovens is also available from the 1964 edition of the publication by U.S. Steel Corporation entitled "The Making, Shaping and Treating of Steel," particularly from chapter 4 thereof.

With the above in mind, reference may now be had to the drawings which schematically represent those portions of a coke oven battery necessary for an understanding of the invention. The coke oven battery is here assumed to be of the underfire type.

Figure 3:
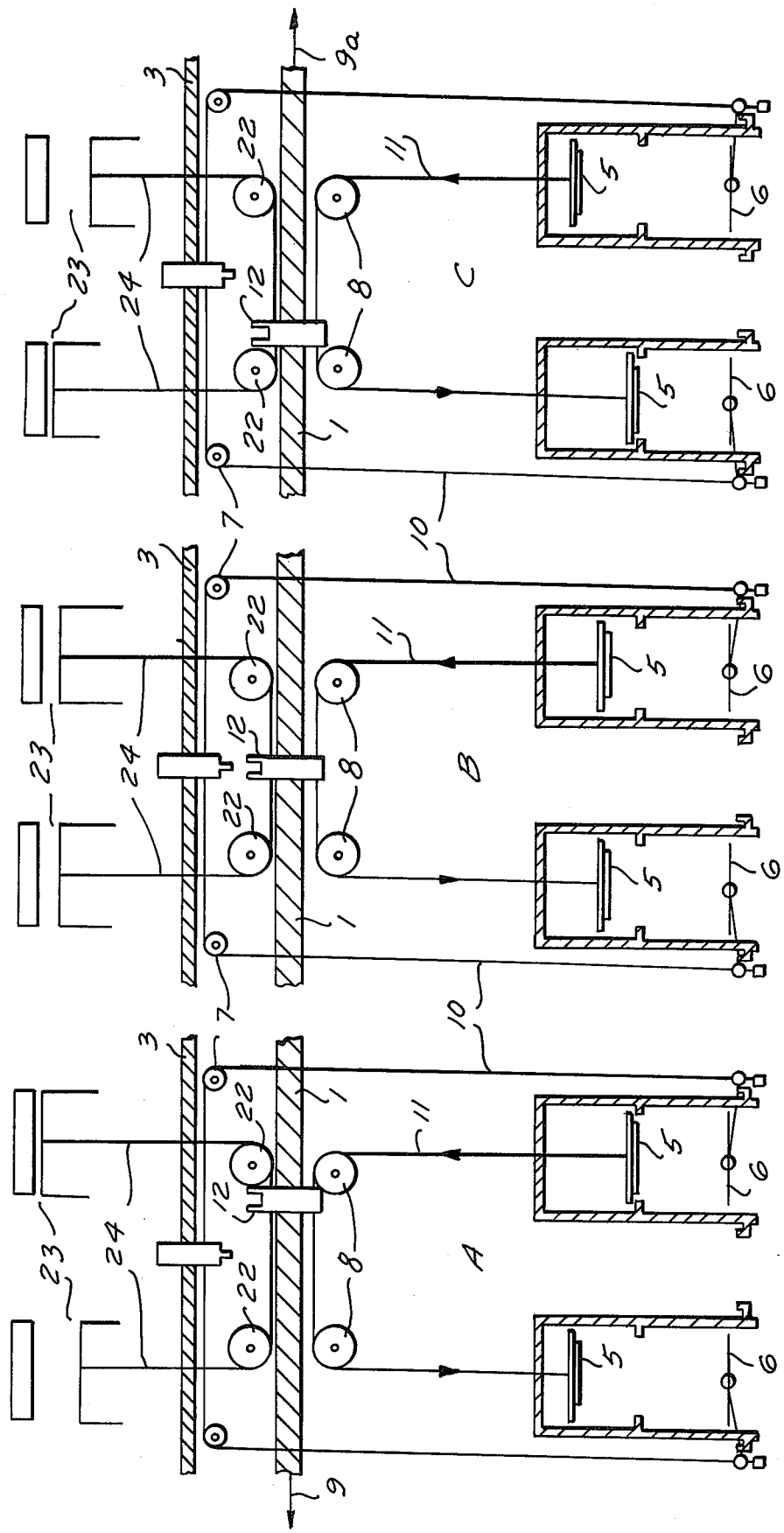
FIG. 3 schematically represents the embodiment portion of FIG. 1 during a period in which the supply of heat to the ovens of the coke oven battery is interrupted.

FIGS. 1 and 3 show that the coke oven battery includes a primary control linkage 1 which extends around the battery. The primary control linkage 1 is operative for changing the flow of air and hot waste gases. The flow of the hot waste gases is controlled by means of valves 5. The flow of the air is controlled by means of valves 23. The valves 5 are connected to cables 11 which pass over rollers 8 and are, in turn, connected to the primary control linkage 1. The valves 23 are connected to cables 24 which pass over rollers 22 and are, in turn, connected to the primary control linkage 1. Thus, the primary control linkage 1 is capable of activating the valves 5. The supply of combustion air occurs by natural aspiration through the valves 23.

Figure 2:
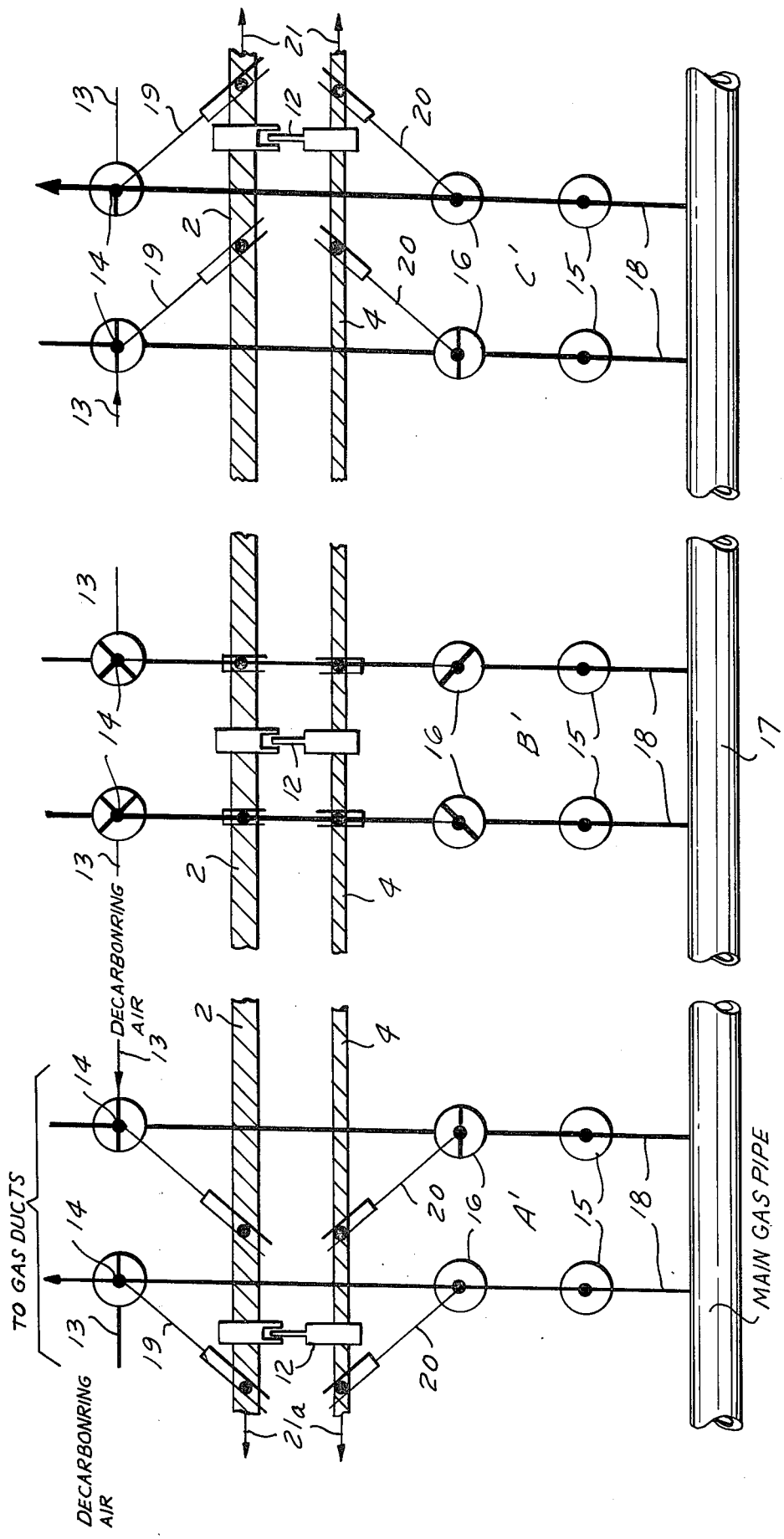
FIG. 2 schematically represents another portion of the embodiment of FIG. 1 during a period in which large quantities of heat are supplied to the ovens of a coke oven battery.
Figure 4:
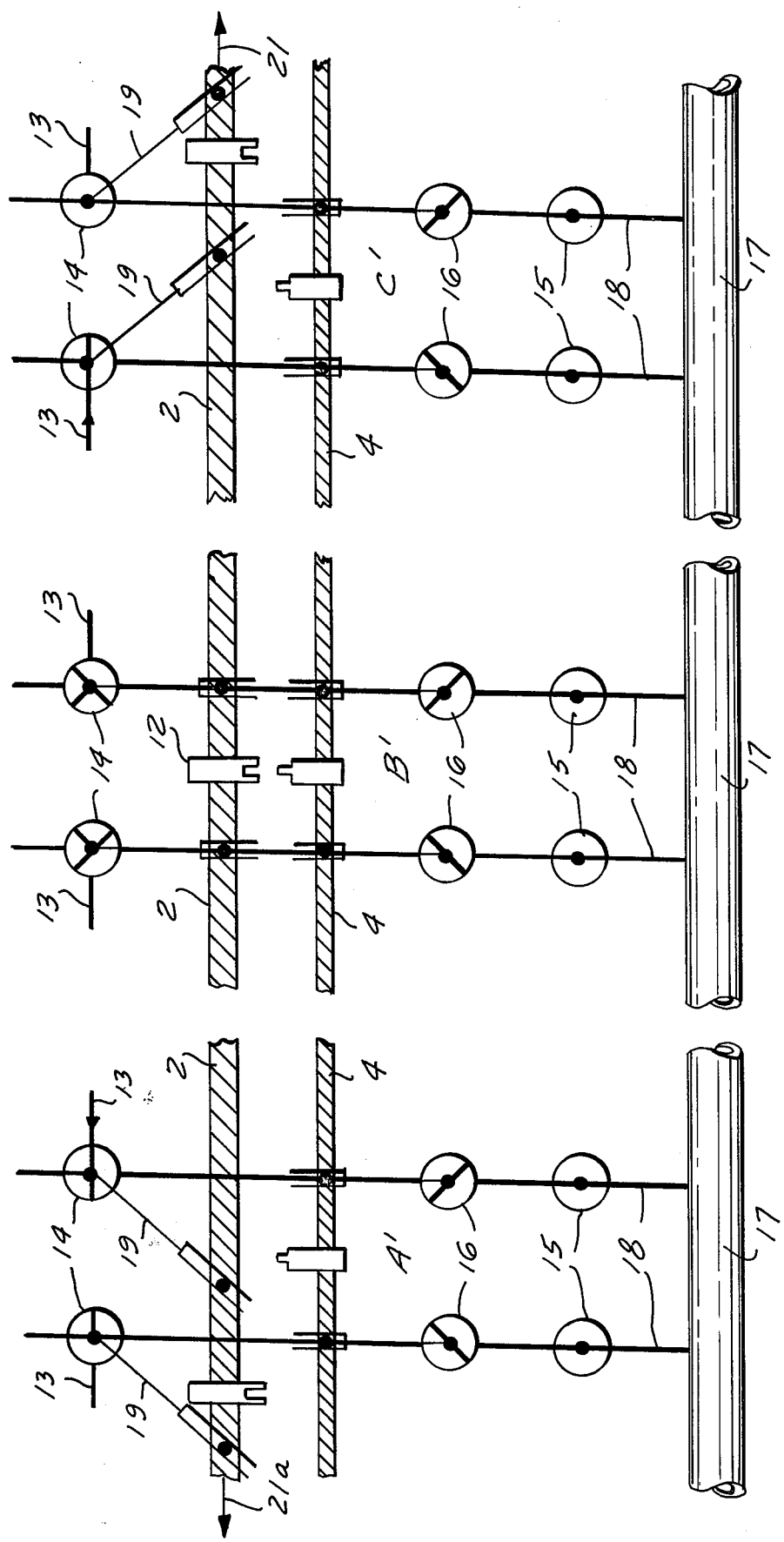
FIG. 4 schematically represents the embodiment portion of FIG. 2 during a period in which the supply of heat to the ovens of the coke oven battery is interrupted.

FIGS. 2 and 4 show that the coke oven battery also includes another primary control linkage 2. The primary control linkage 2 is operative for controlling the flow of decarbonizing air for the ovens. The decarbonizing air is admitted into three-way valves 14 via conduits 13. The valves 14 are connected with cables 19 which, in turn, are connected with the primary control linkage 2. Thus, the primary control linkage 2 is capable of activating the valves 14. The primary control linkage 2 is common to all of the ovens of the battery, that is, the primary control linkage 2 operates the valves 14 for all of the ovens of the battery together.

It is assumed for the illustrated embodiment that the ovens of the battery are arranged or combined in groups of 5 to 10 ovens each with all of the ovens of a given group being in the same coking condition or at the same point of the coking operation at any time so that all of the ovens of a given group are being heated in the same manner.

In addition to the primary control linkages 1 and 2, each group of ovens has associated with it an auxiliary control linkage 3 for regulating the pressure in the ovens of the group as may be seen from FIGS. 1 and 3. The pressure in the ovens is adjusted by means of throttle valves 6. The valves 6 are connected to cables 10 which pass over rollers 7 and are, in turn, connected with the auxiliary control linkages 3. Thus, the auxiliary control linkages 3 are capable of activating the valves 6.

In addition to the primary control linkages 1 and 2 and the auxiliary control linkage 3, each group of ovens has further associated with it another auxiliary control linkage 4 for regulating the flow of the fuel or underfire gas as seen from FIGS. 2 and 4. The fuel is conveyed to the ovens through a main pipe 17. Conduits 18 branch off from the pipe 17 and lead to the different ovens. The fuel flow to the ovens is adjusted via simple control valves 16 arranged in the respective conduits 18 and a control valve 16 is provided for each heating wall and heating phase. The valves 16 are connected to cables 20 which, in turn, are connected with the auxiliary control linkages 4. Thus, the auxiliary control linkages 4 are capable of activating the valves 16.

Valves 15 are also provided in the respective conduits 18 in addition to the valves 16. The valves 15 are hand-operated shut-off valves which serve to isolate a heating wall from the fuel flow in the event that repair work is necessary.

Each of the auxiliary control linkages 3 is arranged closely adjacent the primary control linkage 1 whereas each of the auxiliary control linkages 4 is arranged closely adjacent the primary control linkage 2. This permits the auxiliary control linkages 3 to be coupled with the primary control linkage 1 and, similarly, permits the auxiliary control linkages 4 to be coupled with the primary control linkage 2.

Automatic coupling devices 12 are provided for coupling the auxiliary control linkages 3 and 4 with the primary control linkages 1 and 2, respectively. The coupling devices 12 permit the auxiliary control linkages 3 and 4 to be connected with the primary control linkages 1 and 2, respectively, and also permit the auxiliary control linkages 3 and 4 to be disconnected from the respective primary control linkages 1 and 2. The coupling devices 12 may, for instance, be in the form of simple mechanical devices such as bolts which are mounted for engagement with the auxiliary control linkages 3 and 4 and which may, as necessary, be forced into openings provided in the respective primary control linkages 1 and 2 by means of compressed air and may, as necessary, be forced back via springs. It will be understood that any other coupling arrangement may also be used for the connection and separation of auxiliary control linkages 3, 4 and primary control linkages 1, 2, respectively.

The operation of the control arrangement according to the invention during the heating phase for an oven group, that is, during a period that large quantities of heat are being supplied to the ovens of a group, is illustrated in FIGS. 1 and 2. The primary control linkage 1 and the auxiliary control linkage 3 of the group being heated are connected with one another via the respective coupling device 12. Similarly, the primary control linkage 2 and the auxiliary control linkage 4 of the group being heated are connected with one another via the respective coupling device 12.

The primary control linkage 1 and the auxiliary control linkage 3 are in phase B of FIG. 1, that is, the middle position, when they are coupled with one another. From phase B, the primary control linkage 1 and the auxiliary control linkage 3 together move in the direction of the arrows 9 to the position identified as phase C. During this movement, the primary control linkage 1 activates the valves 5 for the hot waste gases via the cables 11 and the rollers 8 and also activates the air inlet valves mentioned previously. At the same time, the auxiliary control linkage 3 activates the valves 6 for controlling the pressure in the ovens via the cables 10 and the rollers 7. From phase C, the primary control linkage 1 and the auxiliary control linkage 3 together move in the direction of the arrows 9a thereby passing through phase B to the position identified as phase A. During this movement, the valves 5 for the hot waste gases, as well as the air inlet valves 23, are again activated by the primary control linkage 1 whereas the valves 6 for controlling the pressure in the ovens are again activated by the auxiliary control linkage 3. The synchronous movements of the primary control linkage 1 and the auxiliary control linkage 3 in the directions of the arrows 9 and 9a continue during the heating phase and the regulation of the oven pressure, as well as the regulation of the flow of the hot waste gases and the air, occur in conventional manner.

The primary control linkage 2 and the auxiliary control linkage 4 are in phase B' of FIG. 2, that is, the center position, when they are coupled with one another. From phase B', the primary control linkage 2 and the auxiliary control linkage 4 together move in the direction of the arrows 21 to the position identified as phase C'. During this movement, the primary control linkage 2 activates the three-way valves 14 for the decarbonizing air via the cables 19. At the same time, the auxiliary control linkage 4 activates the valves 16 for the fuel via the cables 20. From phase C', the primary control linkage 2 and the auxiliary control linkage 4 together move in the direction of the arrows 21a thereby passing through phase B' to the position identified as phase A'. During this movement, the valves 14 for the decarbonizing air are again activated by the primary control linkage 2 whereas the valves 16 for the fuel are again activated by the auxiliary control linkage 4. The synchronous movements of the primary control linkage 2 and the auxiliary control linkage 4 continue during the heating phase.

When the heating operation for the oven group is to be interrupted, the primary control linkage 1 and the auxiliary control linkage 3 are disconnected from one another and, similarly, the primary control linkage 2 and the auxiliary control linkage 4 are disconnected from one another. The uncoupling of the primary control linkage 1 and the auxiliary control linkage 3 occurs in the center position, that is, phase B, which is always associated with a short pause in the movement of the primary control linkage 1 and the auxiliary control linkage 3. In the same manner, the uncoupling of the primary control linkage 2 and the auxiliary control linkage 4 occurs in phase B', that is, the center position, which is likewise always associated with a short pause in the movement of the primary control linkage 2 and the auxiliary control linkage 4. The uncoupling of the primary control linkage 1 and the auxiliary control linkage 3, as well as the uncoupling of the primary control linkage 2 and the auxiliary control linkage 4, may be effected via an impulse generated by means of a program which controls all oven groups. The uncoupling of the primary control linkages 1 and 2 from the respective auxiliary control linkages 3 and 4 has the effect shown in FIGS. 3 and 4.

As illustrated in FIG. 3, the primary control linkage 1 continues to move in the directions of the arrows 9 and 9a after being disconnected from the auxiliary control linkage 3. Thus, the air inlet valves 23, as well as the valves 5 for the hot waste gases, continue to be activated during the interruption in the heating operation as indicated in phase A and C of FIG. 3. On the other hand, the auxiliary control linkage 3 remains stationary in the center position, that is, phase B, after being disconnected from the primary control linkage 1 and the valves 6 operated by the auxiliary control linkage 3 no longer take part in the shifts or changes which are occurring. Thus, as shown in phase A and C of FIG. 3, the valves 6 for controlling the pressure in the ovens remain in their closed positions during the interruption in the heating operation. The valves 6 do not close gastightly and remain open to some extent but preferably only so far as is necessary to insure that the minimum amount of scavenging air required on the grounds of safety may be aspirated through the oven system.

As illustrated in FIG. 4, the primary control linkage 2 continues to move in the directions of the arrows 21 and 21a after being disconnected from the auxiliary control linkage 4. Thus, the valves 14 for the decarbonizing air continue to be activated during the interruption in the heating operation as indicated in phases A' and C' of FIG. 4 and the decarbonizing air continues to be admitted in cycling rythm in phases A' and C'. On the other hand, similarly to the auxiliary control linkage 3, the auxiliary control linkage 4 remains stationary in the center position, that it, phase B'. Since the valves 16 for controlling the fuel are closed in phase B', the introduction of fuel, e.g., gas, through the main pipe 17 and the conduits 18 is interrupted.

When the interruption in the heating operation is to be ended and the ovens are to be supplied with heat once more, it is merely necessary to again couple the primary control linkages 1 and 2 with the respective auxiliary control linkages 3 and 4 via the coupling devices 12 as the primary control linkages 1 and 2 pass through the phases B and B', respectively, that is, as the primary control linkages 1 and 2 pass through their center positions. The period for which the heating operation is interrupted may be of any desired duration but, on the grounds of symmetry, should last for at least two complete cycles.

During the heating operation, the air inlet valves 23 the valves 5 for the waste gases and the valves 14 for the decarbonizing air operate in a cycling rhythm so as to draw air and hot waste gases through the heating system. The quantities of air and hot waste gases drawn through the heating system are regulated by means of the valves 6 for controlling the pressure in the ovens. During the interruptions in the heating operation, the air inlet valves 23, the valves 5 for the waste gases and the valves 14 for the decarbonizing air have the responsibility of permitting scavenging air to pass through the system. The valves 6 for controlling the oven pressure here remain in preferably a minimum open position so as to hold the quantities of scavenging air to the smallest possible values.

Figure 5:
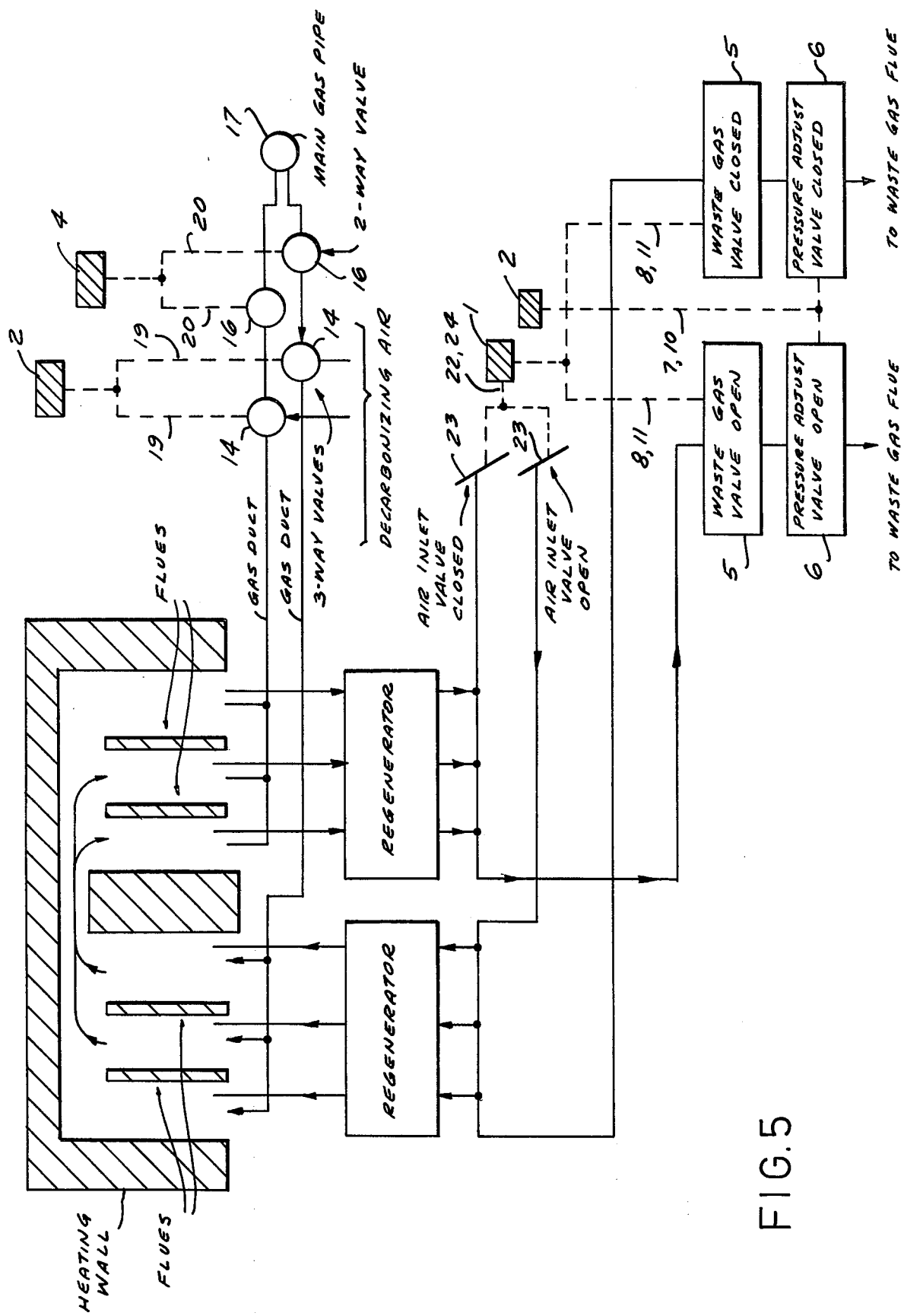
FIG. 5 schematically depicts the conventional interconnections among the various valves depicted in FIGS. 1–4 in a conventional coking oven battery.

FIG. 5 schematically depicts the conventional interconnections among the various valves depicted in FIGS. 1-4 in a conventional coking oven battery.

The arrangement according to the invention permits a programmed heat supply for the ovens of a coke oven battery which are arranged in groups in such manner that periods during which heat is supplied to the ovens alternate with periods during which no heat is supplied to the ovens. The regulation of the entire battery may be undertaken from a central location and the individual groups may be individually supplied with heat by coupling auxiliary control linkages provided for the different groups with, and uncoupling the auxiliary control linkages from, the respective primary control linkages. The devices necessary for accomplishing this do not generate any great costs and are very reliable. It is even possible, with justifiable expenditure, to equip existing batteries so as to make it possible for them to undergo programmed heating.

Furthermore, the arrangement of the invention makes it possible to switch from a programmed operation to a non-programmed operation and vice versa and this may be carried out without difficulties. The controls required for heating are the same as those found on conventionally equipped coke oven batteries.

It will be understood that each of the elements described above, or two or more together, may also find a useful application in other types of constructions differing from the types described above.

While the invention has been illustrated and described as embodied in a coke oven battery having means for changing the heat supply, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a battery of coke ovens of the type whose successive heating sections are each comprised of first and second parts, the first and second parts being each provided with respective first and second gas ducts for feeding combustion gas into the respective part from the main gas pipe, respective first and second decarbonizing-air ducts for the supply of decarbonizing air, respective first and second three-way valves connected in the respective gas ducts, each three-way valve having a decarbonizing setting in which it connects the respective decarbonizing-air duct to the respective gas duct while blocking the flow of combustion gas, each three-way valve having a combustion-gas setting in which it connects the respective gas duct to the main gas pipe while blocking the flow or decarbonizing air, first and second two-way valves in the respective gas ducts, each two-way valve being located intermediate the main gas pipe and the respective three-way valve, each two-way valve having an open setting and a closed setting, a first air duct system including a respective first combustion-air-infeed branch and a respective first waste-gas-outfeed branch, a respective first air inlet valve in the combustion-air-infeed branch operative when open for admitting combustion air through the combustion-air-infeed branch into the first part of the heating section, a respective first waste gas valve in the waste-gas-outfeed branch operative when open for conveying waste gas from the first part of the heating section through the waste-gas-outfeed branch to the waste gas flue, and a respective first pressure valve in the waste-gas-outfeed branch downstream of the waste gas valve operative for controlling the flow of gas through the waste-gas-outfeed branch, a second air duct system including a respective second combustion-air-infeed branch and a respective second waste-gas-outfeed branch, a respective second air inlet valve in the second combustion-air-infeed branch operative when open for admitting combustion air through the second combustion-air-infeed branch into the second part of the heating section, a respective second waste gas valve in the second waste-gas-outfeed branch operative when open for conveying waste gas from the second part of the heating section through the second waste-gas-outfeed branch to the waste gas flue, and a respective second pressure valve in the second waste-gas-outfeed branch downstream of the second waste gas valve operative for controlling the flow of gas through the second waste-gas-outfeed branch, the battery of coke ovens being of the type operated with periodic reversal between first and second heating modes, in the first heating mode the first air inlet valve being open and the second closed, the first two-way valve being open and the second closed, the first three-way valve being in the combustion-gas setting and the second in the decarbonizing setting, the first waste gas valve being closed and the second open, the first pressure valve being closed and the second open, whereby combustion gas is fed into the first heating section part through the first gas duct, combustion air is fed into the first heating section part through the first combustion-air-infeed branch, waste gas is conveyed from the second heating section part through the second waste-gas-outfeed branch to the waste gas flue, and decarbonizing air is fed into the second gas duct through the second three-way valve, in the second heating mode the first air inlet valve being closed and the second open, the first two-way valve being closed and the second open, the first three-way valve being in the decarbonizing setting and the second in the combustion-gas setting, the first waste gas valve being open and the second closed, the first pressure valve being open and the second closed, whereby combustion gas is fed into the second heating section part through the second gas duct, combustion air is fed into the second heating section part through the second combustion-air-infeed branch, waste gas is conveyed from the first heating section part through the first waste-gas-outfeed branch to the waste gas flue, and decarbonizing air is fed into the first gas duct through the first three-way valve, the battery of coke ovens furthermore being of the type operated with periodic reversal between heating and non-heating modes, the heating mode being constituted by the aforementioned periodic reversal between the first and second heating modes, the non-heating mode being constituted by periodic reversal between first and second non-heating modes, in the first non-heating mode the first and second air inlet valves, the first and second three-way valves, and the first and second waste gas valves all being in their first-heating-mode settings, in the second non-heating mode the first and second air inlet valves, the first and second three-way valves, and the first and second waste gas valves all being in their second-heating-mode settings, in both the first and second non-heating modes the first and second two-way valves both being closed, and the first and second pressure valves both being in settings intermediate their respective first-heating-mode and second-heating-mode settings, the improvement comprising a control system having a first control bar extending along the battery of coke ovens and shiftable between a first-heating-mode position and a second-heating-mode position and first mechanical linkage means mechanically linking the first control bar to the first and second air inlet valves and to the first and second waste gas valves for correspondingly moving those valves between their first-heating-mode and second-heating-mode settings;

a second control bar extending along the battery of coke ovens and shiftable between a first-heating-mode position and a second-heating-mode position and second mechanical linkage means mechanically linking the second control bar to the first and second three-way valves for correspondingly moving the latter between their first-heating-mode and second-heating-mode settings, a third control bar extending along the battery of coke ovens alongside the first control bar and shiftable between a first-heating-mode position and a second-heating-mode position and third mechanical linkage means linking the third control bar to the first and second pressure valves for correspondingly moving the latter between their first-heating-mode and second-heating-mode settings;

a fourth control bar extending along the battery of coke ovens alongside the second control bar shiftable between a first-heating-mode position and a second-heating-mode position and fourth mechanical linkage means linking the fourth control bar to the first and second two-way valves for correspondingly moving the latter between their first-heating-mode and second-heating-mode settings; and controllable coupling means coupling the first control bar to the third control bar and coupling the second control bar to the fourth control bar for causing the first and third control bars when coupled to share shifting movement and for causing the second and fourth control bars when coupled to share shifting movement, but activatable for disestablishing the coupling between the first and third control bars and for disestablishing the coupling between the second and fourth control bars, whereby said control system is capable of effecting not only reversal between the first and second heating modes but also changeover from the heating mode to the non-heating mode and reversal between the first and second non-heating modes, this capability resulting from the fact that the aforementioned controllable coupling means is activatable for disestablishing the coupling between the first and third control bars and for disestablishing the coupling between the second and fourth control bars, whereby for reversal between the first and second non-heating modes the first and second control bars can continue to be shifted between their first-heating-mode and second-heating-mode positions with the decoupled second and fourth control bars left in positions intermediate their respective first-heating-mode and second-heating-mode positions.

* * * * *